Aug. 10, 1937.  R. W. DE LANCEY ET AL  2,089,186
LIQUID METER
Filed Aug. 30, 1935    2 Sheets-Sheet 2
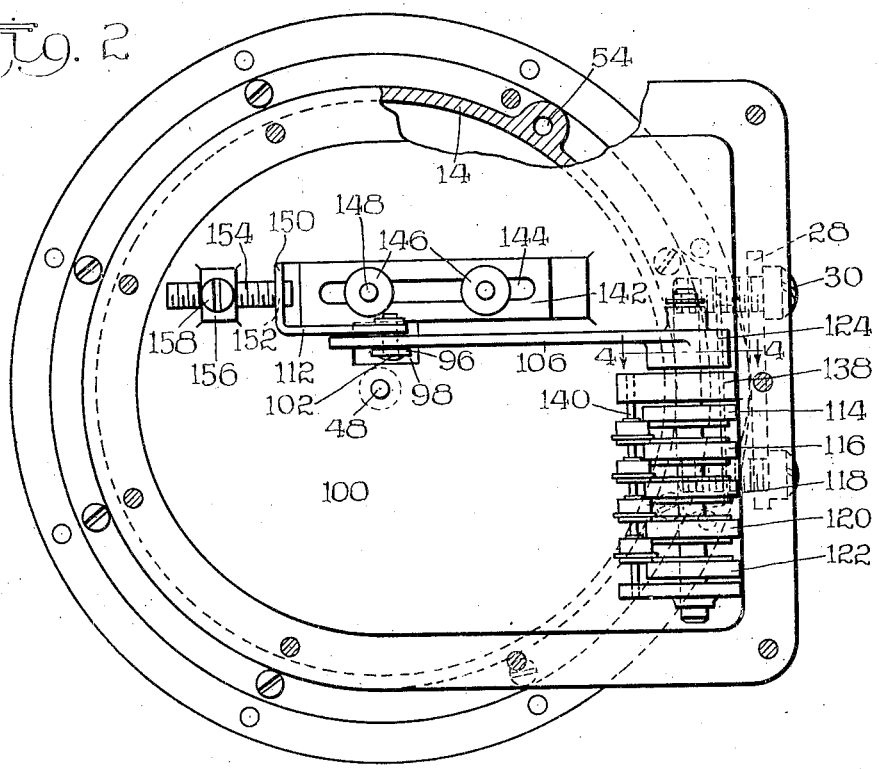
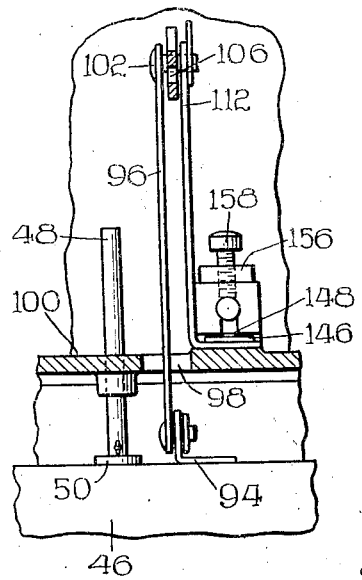
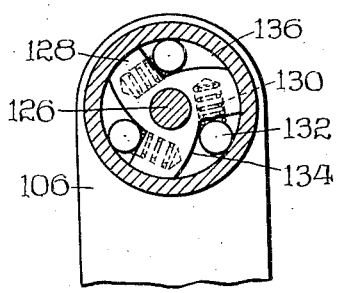
Inventors:
Ralph W. DeLancey
Carlton P. Ainsworth
By Freeman, Sweet, Albrecht & Weidman
Attorneys Patented Aug. 10, 1937

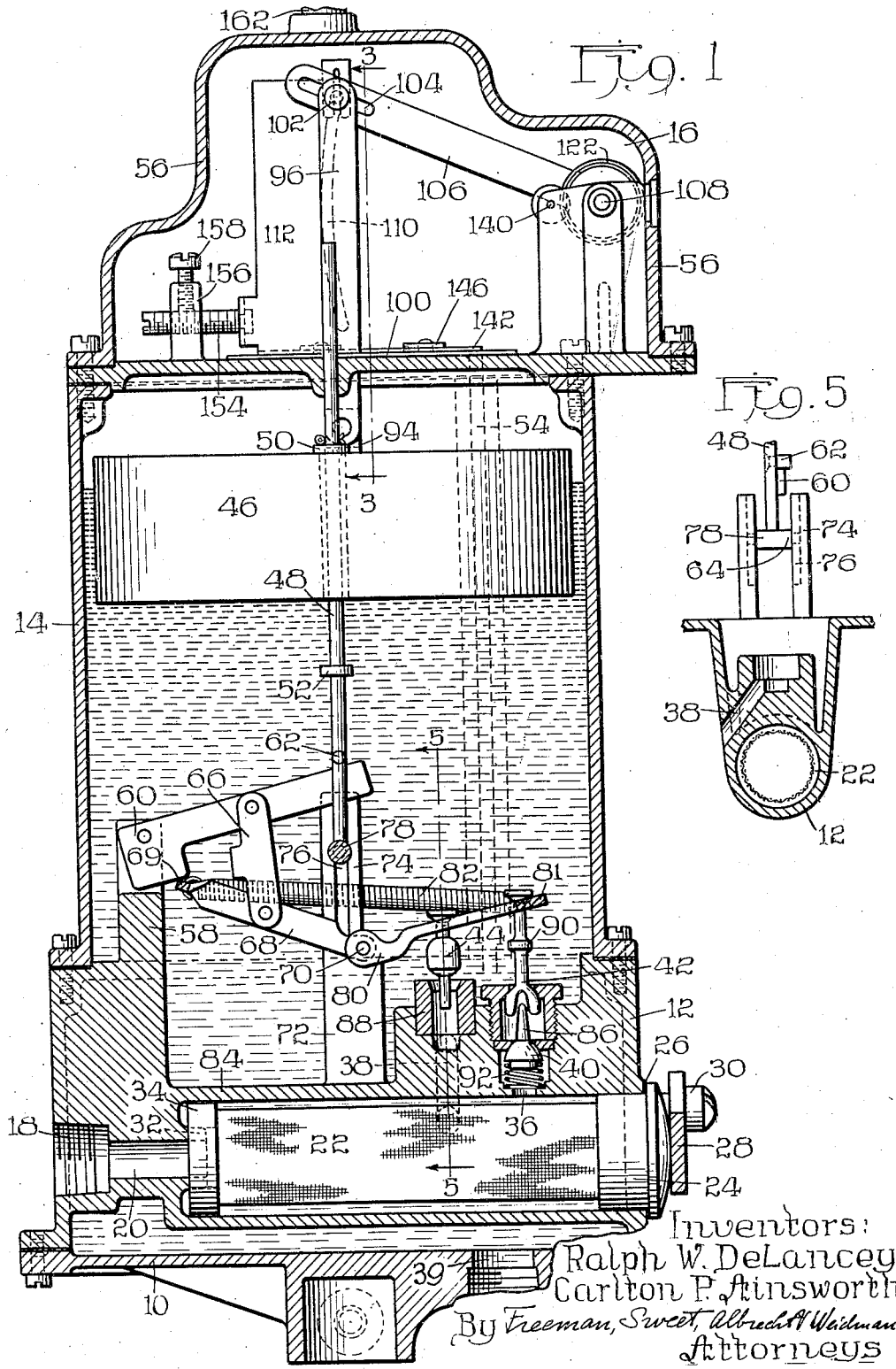

2,089,186

UNITED STATES PATENT OFFICE 2,089,186

LIQUID METER

Ralph W. De Lancey and Carlton P. Ainsworth,
Lynn, Mass.

Application August 30, 1935, Serial No. 38,513

7 Claims. (Cl. 73—225)

Our invention relates to domestic heating with fuel oil, and includes among its objects and advantages an improvement in keeping track of the use of fuel by the customer in such a way as to substantially eliminate controversies between the customer and the dealer as to the amount of fuel delivered.

In the accompanying drawings:

Figure 1 is a vertical section of a meter according to the invention;

Figure 2 is a plan view of the top compartment containing the registering dials;

Figure 3 is a section on line 3—3 of Figure 1;

Figure 4 is a section on line 4—4 of Figure 2; and

Figure 5 is a section on line 5—5 of Figure 1.

In the embodiment of the invention selected for illustration, the meter comprises a base 10, a lower storage chamber 12, an upper storage chamber 14, and registering means on top housed in the chamber 16.

In use the meter is connected between the home owner's storage tank and the fuel burner. It thus provides an accurate register of the volume of liquid as it passes out of the storage tank. With the meter thus located, it is possible for the home owner and dealer to do business on the basis of payment by the home owner at the time the fuel is withdrawn from the tank, instead of at the time the tank is filled. This makes it immaterial when the tank is filled, provided it is never allowed to become empty, and the dealer is enabled to use the storage tanks of his customers for his own storage capacity. Also, because the meter itself can be sealed and certified by the state inspectors, just like the gas meter and water meter, all controversies as to the amount of fuel delivered are avoided.

Accordingly, fuel from the storage tank may enter through the inlet 18 passing first through the tubular passage 20 into the interior of the barrel screen 22. This screen is held in place by a plug 24 provided with a sealing gasket at 26 and clamped home against the sealing gasket by a bridge 28 held down by fastening screws, one of which is shown at 30. It has been found that a relatively loose mechanical fit at the neck 32 where the nipple 34 on the intake end of the screen rides over the end of the passage 20, is ample to permit the screen to function effectively to withdraw any solid impurities in the supply that might interfere with the functioning of the meter or of the burner and associated devices.

From the screen 22 the fuel passes upwardly through the uptake 36 subject to automatic valve control, to be described hereinafter, into the main measuring chamber 14, and from the measuring chamber 14 it passes down again subject to automatic valve control, through the lateral passage 38 shown in Figures 1 and 5 into a sump occupying substantially the entire volume of the lower storage chamber 12.

From the lower storage chamber 12 it passes through the outlet 39 to the burner and associated devices.

The service for which this meter is intended imposes certain particular requirements for successful operation. The flow is normally low, in many cases being not more than two gallons per hour of continuous operation of the burner, and in some cases even less. Some types of burners employ an oil pilot light and the meter should be able to register the flow to this pilot light which may not exceed a gallon in twenty-four hours. Often, also, the flow is under a very low head.

It is thus important that the parts of the meter shall operate freely without any tendency to stick or bind, and it is also important that the valve mechanism for controlling the flow through various parts of the meter shall operate easily and positively.

*Flow control*

The automatic valve means for the chamber 14 comprises a double intake valve 40 and 42 and a single discharge valve 44. Power to operate these valves comes from the float 46. The central actuating rod 48 passes through the float 46 with generous clearance between the rod and float to permit free relative movement limited by an upper contact flange 50 and a lower contact flange 52 on the rod 48. In the position illustrated in Figure 1 the mechanism has just been moved to the position shown, and the chamber 14 contains a maximum amount of liquid. Both valves 40 and 42 are closed and the open valve 44 establishes free communication between the chamber 14 and the lower chamber 12. From the chamber 12 a small air vent 54 runs up through the wall of the chamber 14, debouching into the chamber 16 inside the space protected by the upper chamber cover 56. Accordingly, the liquid in chamber 12 will rise in the vent 54 to the same level as in the chamber 14.

In the absence of the withdrawal of fuel the parts will remain in the position of Figure 1 indefinitely, and leakage into the chamber 14 is prevented by both valves 40 and 42, each of which presses upwardly against its seat and each of which is held closed by its own independent spring. The employment of two independently seated valves reduces the possibility of leakage into the chamber 14 occasioned by improper seating of a valve due to the presence of foreign matter on the valve seat or from other cause, during the time when oil is flowing out of these chambers, any such leakage failing to be registered by the meter.

Any withdrawal of fuel through the outlet 39 will lower the liquid level and the float 46 will move down accordingly. This withdrawal will continue until the float 46 engages the contact flange 52.

Pivoted on a bifurcated standard 58 is a primary actuating lever 60, the free end of which lies between the upper contact member 62 and the lower contact member 64 carried by the actuating rod 48. An intermediate point of the lever 60 is connected by a link 66 to an intermediate point of the primary snap-over lever 68 pivoted at 70 on the central pedestal 72. The central pedestal 72 is continued up above the pivot 70 into spaced standards 74 slotted at 76 to receive a guide head 78 at the lower end of the rod 48. The secondary snap-over lever 80 operates the valves 40, 42, and 44, and is also pivoted on the same pintle at 70. The remote ends of the levers 68 and 80 are T-shaped as indicated at 69 and 81, and the ends of the T's are interconnected by a pair of springs, one of which is illustrated at 82.

Continued downward movement of the float after contacting the flange 52 will turn the lever 60 in a clockwise direction and the lever 68 in a counterclockwise direction without any movement of the lever 80 until the springs 82 have been stretched and the levers 68 and 80 are in alignment with each other. During the initial stages of this movement the force necessary to elongate the springs 82 will lift the float 46 and cause it to ride higher with respect to the liquid level in the chamber, but at the time dead center position is reached, the effective force of the springs 82 has been gradually decreased to zero, so that at dead center position the float 46 will ride at the normal undisturbed level with respect to the liquid in which it floats.

As soon as dead center is passed, the arm 68 will snap down as far as it can go, being limited in its downward movement either by contact between the end of the arm 68 and the bottom wall at 84, or in any other suitable way as by contact between any part of the arm 60 and the pedestals 58 or 74. The force of the springs 82 is now effective with a fairly large angle to snap the lever 80 down as far as it will go. This downward movement will first deprive the valve 42 of its support on the lever 80 so that the valve 42 drops down to ride on the tit 86 projecting upwardly from the valve 40; second, the lever 80 will permit the valve 44 to move down onto its seat 88; third, the lever 80 will continue down and strike the flange 90 in the middle of the stem of the valve 42, and move both valves 42 and 40 down against the tension of the lower valve holding spring 92 to open communication between the chamber 14 and the inlet 18; fourth, the opening movement of the valves 42 and 40 will be limited by mechanical contact of the lever 80 with the upper ball-shaped portion of the valve 44, which imposes on the valve 44 the force of the springs 82 to hold the valve 44 tightly closed.

In this position the contents of the chamber 12 are completely cut off from the chamber 14, but by reason of the air vent 54, the fuel in the chamber 12 is still available to feed the burner, which can continue to function without interruption during the refilling of chamber 14.

Movement of the parts to the refilling position as above explained causes fuel to flow in at a relatively rapid rate through the inlet 18 and refill the chamber 14. During the initial stages of this refilling the float 46, which was previously in contact with the flange 52, will move up a considerable distance and then make contact with the upper flange 50. The further upward movement of the float will lift the lever 68 until it again moves into dead center alignment with the lever 80, and at this point the parts will snap back into the position illustrated in Figure 1, the springs 82 acting to close the valve 42, and the spring 92 closing the valve 40. The chamber 14 is now refilled to the condition indicated in Figure 1 and again connected with the sump 12, which will promptly refill until the liquid in it moves up the air vent 54 to the level of the liquid in the chamber 14.

Each of the valves 42 and 44, being provided with a stem extending upwardly from the base of the chamber 14 and through a hole in the lever arm 80 and having enlarged spaced head portions above and below the arm 80 too large to pass through these holes, has thus a lost motion connection with the arm 80, that for the valve 42 being of greater extent than that for the valve 44 since the lever acts on the valve 42 further from its fulcrum than it acts on the valve 44. It will be noted also that all three valves 40, 42 and 44 are set to close in the direction of fluid flow and that the valves 40 and 44 are further biased to normally closed position, the valve 40 by the spring 92, and the valve 44 by gravity. The lost motion between the lever arm 80 and the valves 42 and 44 provides for an intermediate position of the lever arm 80 in which both inlet and outlet passages may be closed, so that with the biasing of the valves controlling these passages to closed positions, the inlet passage opens only after the outlet passage has been closed and the outlet passage opens only after the inlet passage has been closed at each actuation of the valves by the float. Thus, even though the snap action mechanism should fail to completely function at any time, there is no opportunity for the liquid to pass through the meter chamber 14 without acting on the float and being registered. In the positions of the parts shown in Figure 1, the arm 80 pressing on the upper head of the inlet valve 42 holds this valve closed, while in the other snapped position of this arm, it bears against the lower head of the outlet valve and holds the outlet valve closed.

*Metering*

We provide registering means conditioned on vertical movement of the float 46 in one direction only and entirely independent of the refilling mechanism, for registering the linear movement of the float in the direction selected, as an indication of the amount of fuel passing through the device. It will be apparent that, with such registering means, nothing but irregularities in the bore of the chamber 14 combined with extreme variations in the excursion of the float 46 would have any effect on the ratio between the amount of fuel passing through the device and the amount of movement registered by the registering means. The registering means illustrated is arranged to be actuated by downward movement of the float 46 and to be inactive during the refilling operation.

A bracket 94 is fixedly mounted on top of the float 46 and loosely pivoted to a vertical connecting link 96. This bracket is secured to the float as near to its center as possible and the link 96 is positioned very near to the vertical, in order that thrust imparted to the float through the link 96 from the register mechanism will be ineffective to tilt the float sufficiently to cause any binding or other interference to its free movement as produced by variation in the amount of liquid within the chamber 14. The link 96 passes through an open clearance hole at 98 in the cover plate 100 separating the chambers 14 and 16. At its upper end the link 96 carries a horizontal pivot 102 which passes through a slot at 104 in an actuating arm 106 pivoted at 108. The pin 102 also passes through a slot 110 in a stationary guide plate 112. This slot is substantially arcuate, but it is not a circle around the axis of the pivot 108. Rather, it is a geometrically computed curve arranged to vary the distance between the pin 102 and the axis 108 in such a way as to compensate for the varying angularity of the link 96, and secure for the lever 106 rotation precisely proportional throughout the range of movement of the device, to the vertical movement of the float 46. Such a shape is not at all difficult to arrive at by simple geometrical layouts of the positions of the linkage, and it happens that a substantially circular arc on a radius approximately twice as great as the distance between the pin 102 and the axis 108 will accomplish such correction with a mathematical accuracy in the layouts materially in excess of the mechanical accuracy of execution.

The lever 106 turns the primary drive shaft of a set of registering dials, 114, 116, 118, 120, and 122. Between the shaft and the lever we position an overriding clutch at 124 of suitable construction such as that indicated in Figure 4, where the shaft 126 carries three arms 128 each housing a spring 130 pressing against a locking ball 132. The locking balls 132 each ride on the curved surface 134 of the back of the next arm, and are wedged between the surface 134 and the barrel 136 of the clutch. The clutch at 124 is set to transmit motion during downward movement of the lever 106. In a fixed bracket 138 we mount a duplicate clutch, set so as to prevent any counterclockwise rotation of the shaft 126. Accordingly, the clutch 138 will hold the shaft 126 stationary during upward movement of the lever 106 compelling the clutch 124 to release and slip.

The parts are preferably so proportioned that one revolution of the dial 114 corresponds to exactly one gallon of fluid passing through the device. Accordingly, the peripheral numbers on the dial 114 indicate tenths of a gallon. The dials are interconnected by the usual backshaft gearing on the shaft 140 to turn the dial 116 one-tenth of a revolution on the completion of each complete revolution of the dial 114, and so on. Thus the dial 116 indicates gallons, the dial 118 tens of gallons, the dial 120 hundreds of gallons, and the dial 122 thousands of gallons.

*Calibration*

The guide plate 112 is integral with a horizontal supporting plate 142 (see Figure 2) slotted at 144 and held down against the uper surface of the plate 100 by washers 146 held in place by pins 148 passing up through the slot 144. At one end of the plate 142, the plate 112 is turned laterally as at 150 to engage the peripheral groove at 152 in the adjusting screw 154. The adjusting screw is threaded through the lug 156 integral with the plate 100, and the set screw 158 is threaded down from the top to engage the side of the adjusting screw. To calibrate the meter before putting it in service, an assembled unit as in Figure 1 is permitted to discharge an accurately measured quantity of liquid. Then if the amount registered on the dials differs from the measured amount, correction is by rotating the adjustment screw 154 to change the effective length of the lever 106. The correct adjustment is maintained by clamping down the set screw 158. Then the cover plate 56 can be bolted in place on the plate 100, and the device is ready for certification by the government inspector. It will be noted that both the air vent 54 and the opening 98 open inside the cover 56 and, where fire regulations require it, a short tube 162 with an open upper end can be mounted on top of the housing 56, extending up a sufficient distance to eliminate the possibility of fire hazard by explosion in case an explosive liquid having appreciable volatility is to be handled by the device.

Without further elaboration the foregoing will so fully explain our invention that others may, by applying knowledge current at the time of application, readily adapt the same for use under various conditions of service.

We claim:

1. In combination, a chamber having a wall provided with an inlet and an outlet passage, a valve for closing each of said passages and biased to closed position and having a stem extending on one side of said wall, a movable member having a pair of spaced openings therethrough for receiving said stems, each of said stems having a head thereon with which said member may engage in its movement to open the corresponding valve, said heads being arranged on opposite sides of said member whereby motion of said member in one direction to a predetermined position opens one of said valves and in the other direction to another position opens the other of said valves, said heads and members being so relatively disposed that in an intermediate position of said member both valves may be closed, a float in said chamber, and means actuated by said float when approaching an upper and a lower position to move said member to open the outlet valve when said float is in the upper position and to open said inlet valve when said float is in the lower position.

2. In combination, a chamber having a wall provided with an inlet and an outlet passage, a valve for closing each of said passages and biased to closed position and having a stem extending on one side of said wall, a movable member having a pair of spaced openings therethrough for receiving said stems, each of said stems having a head thereon with which said member may engage in its movement to open the corresponding valve, said heads being arranged on opposite sides of said member whereby motion of said member in one direction to a predetermined position opens one of said valves and in the other direction to another position opens the other of said valves, said heads and members being so relatively disposed that in an intermediate position of said member both valves may be closed, a float in said chamber, and means actuated by said float when approaching an upper and a lower position to move said member to open the outlet valve when said float is in the upper position and to open said inlet valve when said float is in the lower position, said stems also having heads spaced from said first mentioned heads and on the opposite sides of said member therefrom positioned to be engaged by said member to cause said member at opposite ends of its motion to hold one valve closed while it holds the other valve open.

3. In combination, a chamber having a wall provided with an inlet and an outlet passage, a normally closed valve for closing each of said passages, each valve having a stem, said stems projecting on the same side of said wall, said valves facing oppositely, an arm pivoted adjacent to one of said valves and engageable with the stems of both valves, a head on each stem engageable by said arm on motion of said arm in one or the other direction to different positions for causing said arm motion to open one or the other valve depending on the direction of said motion, said heads being so related to said arm that in an intermediate position of said arm both valves may be closed, a float in said chamber, and operative connections from said float for snapping said arm from one to the other of said positions to open said inlet valve when said float approaches a lower position in said chamber and to open said outlet valve when said float approaches an upper position in said chamber.

4. In combination, a chamber having a wall provided with an inlet and an outlet passage, a normally closed valve for closing each of said passages, each valve having a stem, said stems projecting on the same side of said wall, said valves facing oppositely, an arm pivoted adjacent to one of said valves and engageable with the stems of both valves, a head on each stem engageable by said arm on motion of said arm in one or the other direction to different positions for causing said arm motion to open one or the other valve depending on the direction of said motion, said heads being so related to said arm that in an intermediate position of said arm both valves may be closed, a float in said chamber, and operative connections from said float for snapping said arm from one to the other of said positions to open said inlet valve when said float approaches a lower position of said chamber and to open said outlet valve when said float approaches an upper position in said chamber, said arm and stems having parts cooperating when said arm is in either of its snapped positions to hold one of said valves in closed position.

5. A liquid meter having a metering chamber provided with inlet and outlet passages, a pair of independently seated valves for controlling said inlet, means acting on one valve to open and close said valve, yielding means tending to close the other of said valves, and operative connections between said valves causing opening of said one valve to a definite extent to open the other valve.

6. A liquid meter having a metering chamber provided with an inlet passage and an outlet passage, one of said passages having a pair of valve seats spaced therealong, a valve cooperating with each valve seat, a spring normally closing one of said valves to its seat, and means opening and closing the other valve with relation to its seat, said valves having parts extending close to each other in such relation that the opening of said other valve to a predetermined extent forces said one valve open.

7. A liquid meter having a meter chamber provided with inlet and outlet passages, valves for controlling said passages, a vertical rod in said chamber, means for supporting said rod for limited axial motion, a snap action valve controlling mechanism actuated by the reciprocation of said rod, a float in said chamber having a central opening through which said rod loosely passes, said rod having upper and lower abutments with which said float may contact when in upper and lower positions of said chamber to actuate said snap mechanism by further motion of the float in the same direction after such contact has been established, and register connections secured to said float substantially in its central vertical axis and operating substantially in said axis for causing actuation of a register on the descent only of said float.

RALPH W. DE LANCEY.
CARLTON P. AINSWORTH.